US005700997A

United States Patent [19]

Takemoto et al.

[11] Patent Number: 5,700,997

[45] Date of Patent: Dec. 23, 1997

[54] GAME PLAY MEDIA DISPENSER

[75] Inventors: Takatoshi Takemoto; Kazunari Kawashima, both of Tokyo, Japan

[73] Assignee: Kabushiki Kaisha Ace Denken, Tokyo, Japan

[21] Appl. No.: 605,225

[22] PCT Filed: Aug. 22, 1994

[86] PCT No.: PCT/JP94/01377

§ 371 Date: Mar. 8, 1996

§ 102(e) Date: Mar. 8, 1996

[87] PCT Pub. No.: WO95/07120

PCT Pub. Date: Mar. 16, 1995

[30] Foreign Application Priority Data

| | | | |
|---|---|---|---|
| Sep. 9, 1993 | [JP] | Japan | 5-224391 |
| Sep. 9, 1993 | [JP] | Japan | 5-224392 |

[51] Int. Cl.[6] .......... G06K 5/00; A63F 7/30

[52] U.S. Cl. .......... 235/1 B; 273/121 D

[58] Field of Search .......... 235/1 B, 1 C, 235/68, 140, 141, 380, 477; 273/119 A, 119 R, 121 R, 121 A, 121 B, 121 D, 122 A

[56] References Cited

U.S. PATENT DOCUMENTS

| | | | |
|---|---|---|---|
| 5,131,655 | 7/1992 | Ugawa | 273/121 B |
| 5,351,954 | 10/1994 | Oursler et al. | 273/127 R |
| 5,509,655 | 4/1996 | Ugawa | 273/121 B |
| 5,516,104 | 5/1996 | Takemoto et al. | 273/121 D |
| 5,517,010 | 5/1996 | Takemoto et al. | 235/380 |

FOREIGN PATENT DOCUMENTS

| | | | |
|---|---|---|---|
| 2-56907 | 5/1984 | Japan | A63F 7/02 |
| 60-20280 | 2/1985 | Japan | A63F 7/02 |
| 61-76181 | 4/1986 | Japan | A63F 7/02 |
| 3-267085 | 11/1991 | Japan | A63F 7/02 |

*Primary Examiner*—Matthew V. Nguyen
*Attorney, Agent, or Firm*—Seed and Berry LLP

[57] ABSTRACT

A game play media dispenser comprises a ball passage 10 for allowing game play media (pachinko balls) 90 to flow, a gear 20 formed with a plurality of recesses 21 engaging with the pachinko balls 90 on an outer peripheral surface and rotating while causing the recesses 21 to engage with pachinko balls 90 flowing through the ball passage 10 in sequence, detection means 70 for detecting the pachinko balls 90 discharged through a discharge port 11, a first stopper 30 that can move to a first engagement position where it can engage with the gear 20 and a first saving position where it does not engage with the gear 20, a second stopper 40 that can move to a second engagement position where it can engage with the gear 20 and a second saving position where it does not engage with the gear 20, first drive means for moving the first stopper 30, second drive means for moving the second stopper 40, and control means for controlling the first drive means and the second drive means for causing the first stopper 30 and the second stopper 40 to engage with the gear 20 alternately.

3 Claims, 9 Drawing Sheets

GAME PLAY MEDIA DISPENSER

TECHNICAL FIELD

This invention relates to a game play media dispenser for discharging game play media such as pachinko balls (Japanese pinball) or coins and is applied to, for example, a pachinko ball dispenser for discharging balls while counting them for automatically replenishing with pachinko balls, automatically paying out pachinko balls for a winning game play, or automatically dispensing pachinko balls in a pachinko machine or a ball lending machine.

TECHNICAL BACKGROUND

A pachinko ball dispenser is known as a game play media dispenser for discharging game play media such as pachinko balls and coins. A conventional pachinko ball dispenser is described in, for example, Japanese Patent Laid-Open No. Hei 3-267085. This conventional example dispenser comprises a ball passage for allowing pachinko balls to flow, and a gear formed with a plurality of recesses engaging pachinko balls on the outer peripheral surface and rotating while making the recesses sequentially engage with the pachinko balls flowing in the ball passage.

The gear is formed with a plurality of projections in one-to-one correspondence with the recesses. Each projection can engage a stopper driven by a solenoid, which is controlled by a drive control section. The gear stops while the stopper is engaged with one of the projections. When the stopper is detached from the projection, the gear is rotated owing to the weight of the pachinko ball. On the other hand, a count sensor for counting pachinko balls discharged through a discharge port of the ball passage is attached to the lower end of the ball passage.

If the stopper is detached from the projection, a pachinko ball in the ball passage causes the gear to rotate, and is then counted by the count sensor and discharged through the discharge port. When the actual number of discharged pachinko balls counted by the count sensor approaches the target number of discharged balls, the drive control section causes the stopper to engage with the projection intermittently for discharging pachinko balls one at a time through the discharge port.

However, in the conventional example, when the stopper is caused to engage with the projection intermittently, the engaging of the stopper with the projection may be delayed due to an operation delay of the solenoid, etc. If the engaging is delayed, the time for which the stopper is detached from the projection is prolonged, during which the gear rotates one recess or more. If the gear thus rotates, an extra pachinko ball or balls are discharged through the discharge port.

DISCLOSURE OF INVENTION

It is therefore an object of the invention to provide a game play media dispenser for discharging game play media, for example, pachinko balls at high speed and accurately.

To this end, according to the invention, there is provided a game play media dispenser which comprises a passage for allowing game play media to flow and a gear being formed with a plurality of recesses engaging with game play media on an outer peripheral surface and, while causing the recesses to engage with game play media flowing through the passage in sequence, rotating owing to the weight of the game play media for discharging the game play media into a discharge port of the passage, wherein as many game play media as a given number are discharged through the discharge port by controlling the rotation of the gear, characterized in that

- the gear further includes a plurality of teeth in one-to-one correspondence with the recesses, that
- the game play media dispenser further includes:
- detection means for detecting game play media discharged through the discharge port;
- a first stopper that can move to a first engagement position where it can engage with at least one of the teeth and a first saving position where it does not engage with any of the teeth;
- a second stopper that can move to a second engagement position where it can engage with at least one of the teeth and a second saving position where it does not engage with any of the teeth;
- drive means for moving the first stopper to the first engagement position and the first saving position, and moving the second stopper to the second engagement position and the second saving position; and
- control means for controlling the moving operation of the first stopper and the moving operation of the second stopper performed by the drive means, that
- the second engagement position is a position where the second stopper at the second engagement position engages with any of the teeth before the gear rotates one recess or more after the engagement of the first stopper with the gear is released, and that
- the control means
- accepts information indicating the given number and sets the number of media to be discharged smaller than the given number by a predetermined number,
- finds the actual number of discharged game play media from the detection result of the detection means, and
- after determining that at least the actual number of discharged media has reached the number smaller than the given number by the predetermined number, causes the drive means to move the first stopper to the first engagement position and the second stopper to the second saving position, and to move the first stopper to the first saving position and the second stopper to the second engagement position alternately, until the control means determines that the actual number of discharged media reaches the given number.

In the game play media dispenser according to the invention, the control means accepts the information indicating the given number, sets the number of media to be discharged smaller than the given number by a predetermined number, and finds the actual number of discharged game play media from the detection result of the detection means. After determining that at least the actual number of discharged media has reached the number smaller than the given number by the predetermined number, the control means causes the drive means to move the first stopper to the first engagement position and the second stopper to the second saving position, and to move the first stopper to the first saving position and the second stopper to the second engagement position alternately, until it determines that the actual number of discharged media reaches the given number.

BEST MODE FOR CARRYING OUT THE INVENTION

Referring now to the accompanying drawings, there is shown the best mode for carrying out the invention as embodiments of the invention. First and second embodiments that we will discuss are configuration examples for applying the invention to pachinko ball dispensers using pachinko balls as game play media.

Figure 1:
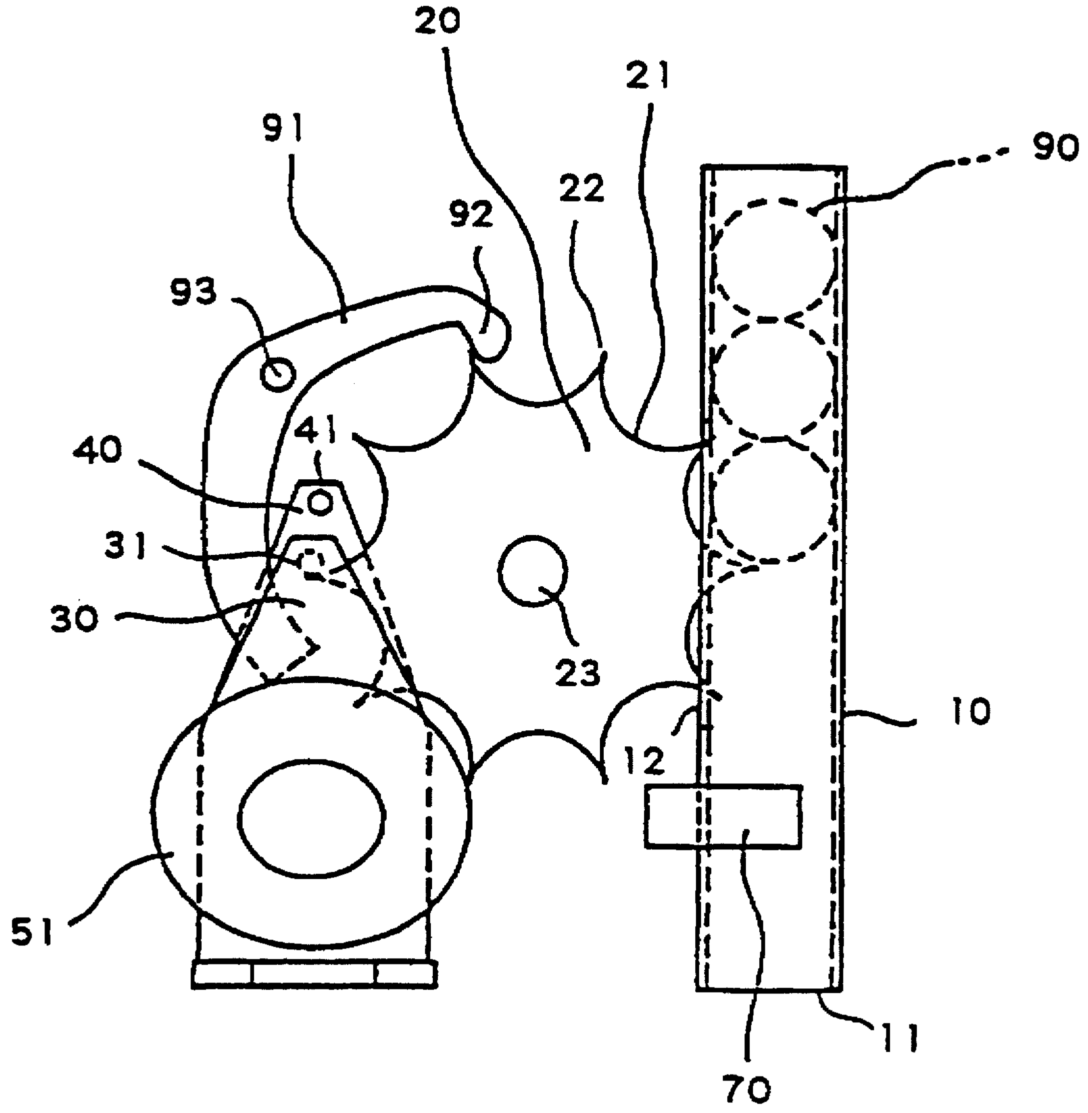
FIG. 1 is a front view of a game play media dispenser of a first embodiment of the invention.
Figure 2:
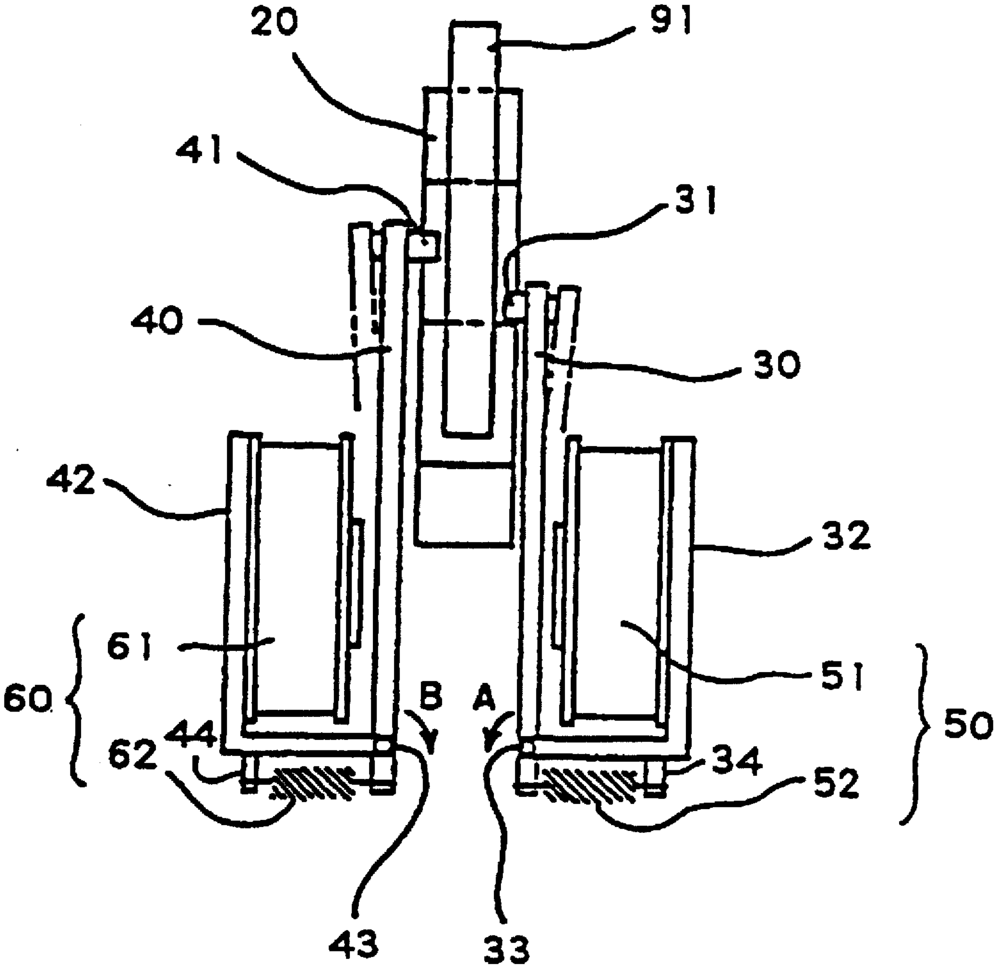
FIG. 2 is a side view of the game play media dispenser of the first embodiment of the invention.

FIGS. 1–4 show a first embodiment of the invention. As shown in FIGS. 1 and 2, a pachinko ball dispenser of the first embodiment comprises a ball passage 10 for allowing pachinko balls 90 to flow, a gear 20 formed with a plurality of recesses 21 engaging with the pachinko balls 90 on an outer peripheral surface, a first stopper 30 and a second stopper 40 engaging with the gear 20, first drive means 50 for driving the first stopper 30, second drive means 60 for driving the second stopper 40, detection means 70 for detecting the pachinko balls 90 discharged through a discharge port 11 of the ball passage 10, and control means 80 (see FIG. 3) for controlling the first drive means 50 and the second drive means 60. The first drive means 50 can be provided, for example, using a first solenoid 51 and a spring 52 as in the embodiment. This also applies to the second drive means 60.

The ball passage 10 is a hollow member for guiding the pachinko balls 90. The ball passage 10 has a side wall formed with notches 12 for allowing each recess 21 of the gear 20 to enter the inside of the ball passage 10.

Each of the recesses 21 of the gear 20 is formed like a circular arc and can engage with a part of the pachinko ball 90. The recesses 21 are formed so as to adjoin along the circumferential direction of the gear 20, as shown in FIG. 1. Therefore, the outer peripheral surface of the gear 20 is formed with sharp-pointed teeth 22 at each boundary between the adjoining recesses 21. The gear 20 is rotatably supported by a support shaft 23 in a state in which it enters the ball passage 10 to such a degree that the recesses 21 can engage with the pachinko balls 90 flowing through the ball passage 10 in sequence. The gear 20 of the embodiment is formed with 10 recesses 21. Therefore, one revolution of the gear 20 causes 10 pachinko balls 90 to be discharged through the discharge port 11 of the ball passage 10. More than 10 recesses 21 may be provided, as required.

A governor 91 for suppressing excessively fast rotation of the gear 20 is disposed on one side of the gear 20. It is supported rotatably by a support shaft 93 parallel with the support shaft 23. During the rotation of the gear 20, a tip 92 of the governor 91 abuts the outer peripheral surface of the gear 20 and decreases the rotation speed of the gear 20 while swinging with the support shaft 93 as the center.

The first stopper 30 has a tip formed with a projection 31. It is rotatably fitted to a first holding case 32 via a support shaft 33, with the projection 31 directed toward the gear 20. The lower end of the first stopper 30 is coupled to a foot 34 of the first holding case 32 via a spring 52. This spring 52 energizes the first stopper 30 counterclockwise (in the direction of arrow A) with the support shaft 33 as the center. In FIG. 1, the first stopper 30 is pushed against the gear 20 by the energy of the spring 52 so as to engage the projection 31 with one of the teeth 22 of the gear 20. The first stopper 30 is placed in such a state, whereby rotation of the gear 20 can be prevented. While the gear 20 is stopped, the pachinko balls 90 in the ball passage 10 are supported by the tooth 22 entering the ball passage 10.

While the gear 20 is stopped, if the tooth 22 only enters slightly into the ball passage 10, the pinballs 90 cannot be reliably caught. Therefore, it is desired that the first stopper 30 is placed so that a tooth 22 enters most deeply into the ball passage 10 when the projection 31 engages with another tooth 22 of the gear 20.

The first solenoid 51 for rotating the first stopper 30 clockwise with the support shaft 33 as the center against the energy of the spring 52 is fixed to an inner side face of the first holding case 32. A first drive circuit 81 (not shown) applies an exciting voltage to the first solenoid 51 for exciting it. When the first solenoid 51 is excited, the first stopper 30 is considered to be a movable element and is attracted directly so as to rotate from a position where the projection 31 engages with the tooth 22 of the gear 20 (first engagement position) to a position where the projection 31 does not engage with any teeth 22 of the gear 20 (first saving position).

On the other hand, the second stopper 40 is placed so as to face the first stopper 30 with the gear 20 between them. It is rotatably fitted to a second holding case 42 rotatably via a support shaft 43. The lower end of the second stopper 40 is coupled to a foot 44 of the second holding case 42 via a spring 62. This spring 62 energizes the second stopper 40 clockwise (in the direction of arrow B) with the support shaft 43 as the center.

The second stopper 40 has, like the first stopper 30, a tip formed with a projection 41. The projection 41 of the second stopper 40 is placed at a position (second engagement position) which is a distance corresponding to the rotation amount of the gear 20 by to about a half of the recess 21 in the rotation direction of the gear 20, from the projection 31 of the first stopper 30. The second engagement position may be such a position where the projection 41 of the second stopper 40 can engage the tooth 22 of the gear 20 before the gear 20 rotates one recess 21 or more after the projection 31 of the first stopper 30 is detached from the tooth 22 of the gear 20.

A second solenoid 61 for rotating the second stopper 40 counterclockwise with the support shaft 43 as the center against the energy of the spring 62 is fixed to an inner side face of the second holding case 42. A second drive circuit 82 (not shown) applies an exciting voltage to the second solenoid 61 for exciting it. When the second solenoid 61 is excited, it rotates the second stopper 40 from a position where the projection 41 engages with the tooth 22 of the gear 20 (second engagement position) to a position where the projection 41 does not engage with any teeth 22 of the gear 20 (second saving position).

If the solenoids are used as the drive means as in the embodiment, metal that can be attracted by the solenoids is used for the first and second stoppers 30 and 40.

The detection means 70 is a sensor that can detect the pachinko balls 90 passing through the ball passage 10; a photoelectric switch is used in the embodiment. It has light emitting and receiving elements (both are not shown) mounted so as to face each other with the ball passage 10 between them. An output of the light receiving element is input to the control means 80 as a detection signal.

Next, the control means of the embodiment will be discussed.

Figure 3:
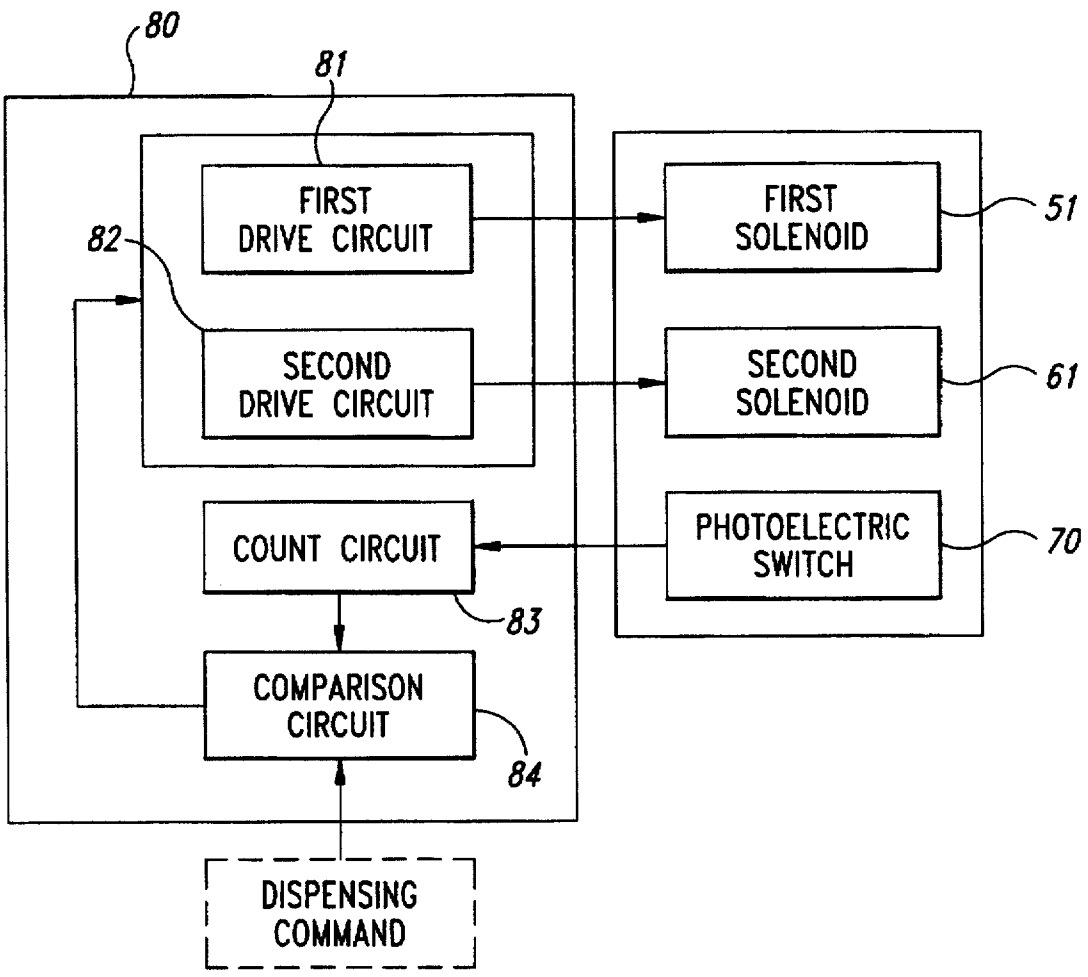
FIG. 3 is a block diagram concerning the game play media dispenser of the first embodiment of the invention.

As shown in FIG. 3, the control means 80 comprises a first drive circuit 81 for applying an exciting voltage to the first solenoid 51, a second drive circuit 82 for applying an exciting voltage to the second solenoid 61, a count circuit 83 for receiving a detection signal from the photoelectric switch 70 and finding the actual number of discharged pachinko balls 90, and a comparison circuit 84 for receiving the count result of the count circuit 83 and a dispensing command from a command circuit (not shown) and supplying an instruction to the first and second drive circuits 81 and 82. The dispensing command contains information indicating the target number of pachinko balls 90 to be discharged (setup number of balls to be discharged). The control means 80 is made up of a CPU, RAM, ROM, etc.; a program for carrying out the operation of a flowchart shown in FIG. 4 is stored in the ROM.

Next, the operation of the embodiment will be discussed.

When a dispensing command is not input to the comparison circuit 84 and the first and second drive circuits 81 and 82 do not apply an exciting voltage, the first and second stoppers 30 and 40 are in the positions indicated by solid lines in FIG. 2, due to the restoring forces of the springs 52 and 62. In the figure, since the projection 31 of the first stopper 30 engages with one of the teeth 22 of the gear 20, the gear 20 stops.

Figure 4:
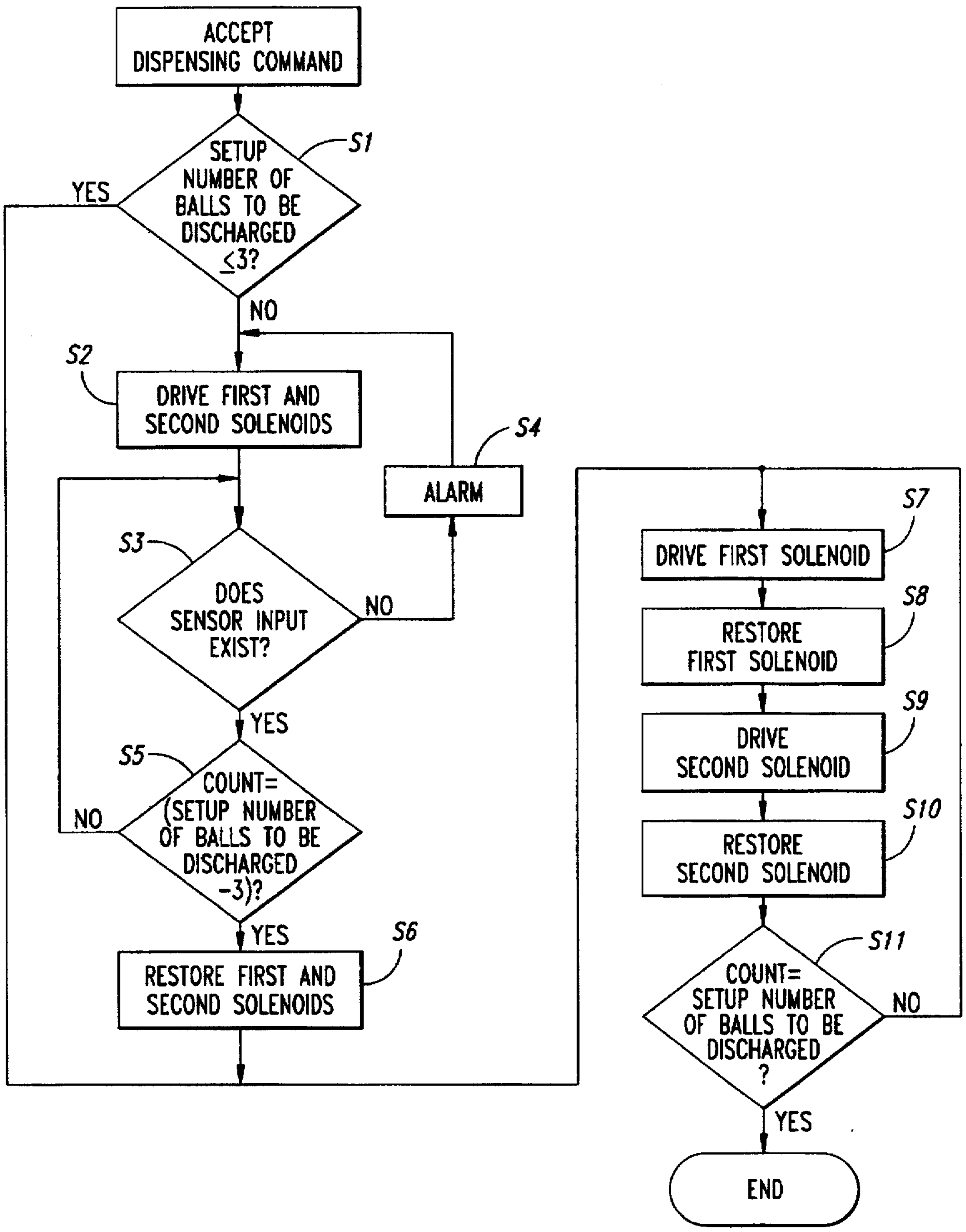
FIG. 4 is a flowchart concerning the operation of the game play media dispenser of the first embodiment of the invention.

Now, when a dispensing command is supplied to the comparison circuit 84, the circuits of the control means 80 including the comparison circuit 84 operate as in the flowchart shown in FIG. 4.

At step S1, the comparison circuit 84 determines whether or not the setup number of discharged balls indicated by the dispensing command is equal to or less than a predetermined number (in the embodiment, 3). If the setup number of discharged balls is greater than 3, at step S2 the comparison circuit 84 instructs the first drive circuit 81 to apply an exciting voltage to the first solenoid 51 and the second drive circuit 82 to apply an exciting voltage to the second solenoid 61. In response to the given instructions, the first and second drive circuits 81 and 82 apply exciting voltages to the first and second solenoids, whereby the first stopper 30 moves to the first saving position and the second stopper 40 moves to the second saving position. When engagement of the first stopper 30 with the gear 20 is released, the gear 20 is enabled to rotate and the pachinko balls 90 in the ball passage 10 are discharged one after another through the discharge port 11 while the gear 20 rotates. The photoelectric switch 70 detects the pachinko balls discharged through the discharge port one by one and outputs the detection result as a detection signal.

At step S3, the count circuit 83 accepts the detection signal, counts the discharged pachinko balls 90, and outputs a signal indicating the count result to the comparison circuit 84. If the photoelectric switch 70 does not output a detection signal because the pachinko balls 90 become jammed or are in short supply, the count circuit 83 outputs an alarm at step S4.

At step S5, the comparison circuit 84 determines whether or not the actual number of discharged balls reaches the number smaller than the setup number of balls to be discharged by a predetermined number. The predetermined number is set to 3 as described above. It can be set as desired.

If the actual number of discharged balls reaches the number smaller than the setup number of discharged balls by the predetermined number, the comparison circuit 84 executes step S6, namely, it causes the first drive circuit 81 to stop the first solenoid 51 and the second drive circuit 82 to stop driving the second solenoid 61. Therefore, the first and second stoppers 30 and 40 move to the engagement positions and the gear 20 stops in the state as shown in FIG. 1, for example.

That is, with the pachinko ball dispenser of the embodiment, if the setup number of discharged balls is set to 100, the gear 20 continues to rotate until the actual number of discharged balls reaches 97. Meanwhile, pachinko balls 90 are discharged consecutively through the discharge port 11.

At step S7, the comparison circuit 84 drives the first solenoid 51 for detaching the projection 31 of the first stopper 30 from the gear 20. The gear 20 rotates owing to the weight of the pachinko ball 90, then abuts the projection 41 of the second stopper 40 and stops. The rotation amount of the gear 20 at this time corresponds to about a half of the recess 21. Next, the comparison circuit 84 moves the first stopper 30 to the first engagement position at step S8.

At step S9, the comparison circuit 84 drives the second solenoid 61 for moving the second stopper 40 to the second saving position. When the projection 41 of the second stopper 40 is detached from the gear 20, the gear 20 rotates, then abuts the projection 31 of the first stopper 30 and stops. The rotation amount of the gear 20 at this time also corresponds to about a half of the recess 21 as described above. At step S10, the comparison circuit 84 moves the second stopper 40 to the second engagement position.

That is, at steps S7–S10, the gear 20 rotates by one recess 21, whereby one of the pachinko balls 90 is discharged through the discharge port 11.

At step S11, the comparison circuit 84 determines whether or not the actual number of discharged reaches the setup up number of balls to be discharged. If not, the comparison circuit 84 executes steps S7–S10; if the actual number of discharged balls reaches the setup up number of balls to be discharged, the comparison circuit 84 exits from the flow shown in FIG. 4. If the setup number of balls to be discharged is equal to or less than 3 at step S1, the comparison circuit 84 executes step S7.

Thus, upon acceptance of a dispensing command, the dispenser of the embodiment discharges pachinko balls at high speed and after the actual number of discharged balls reaches the number smaller than the setup number of balls to be discharged by the predetermined number, discharges pachinko balls accurately one at a time until the actual number of discharged balls reaches the setup number of balls to be discharged.

Next, a second embodiment of the invention will be discussed with reference to FIGS. 5–9.

Figure 5:
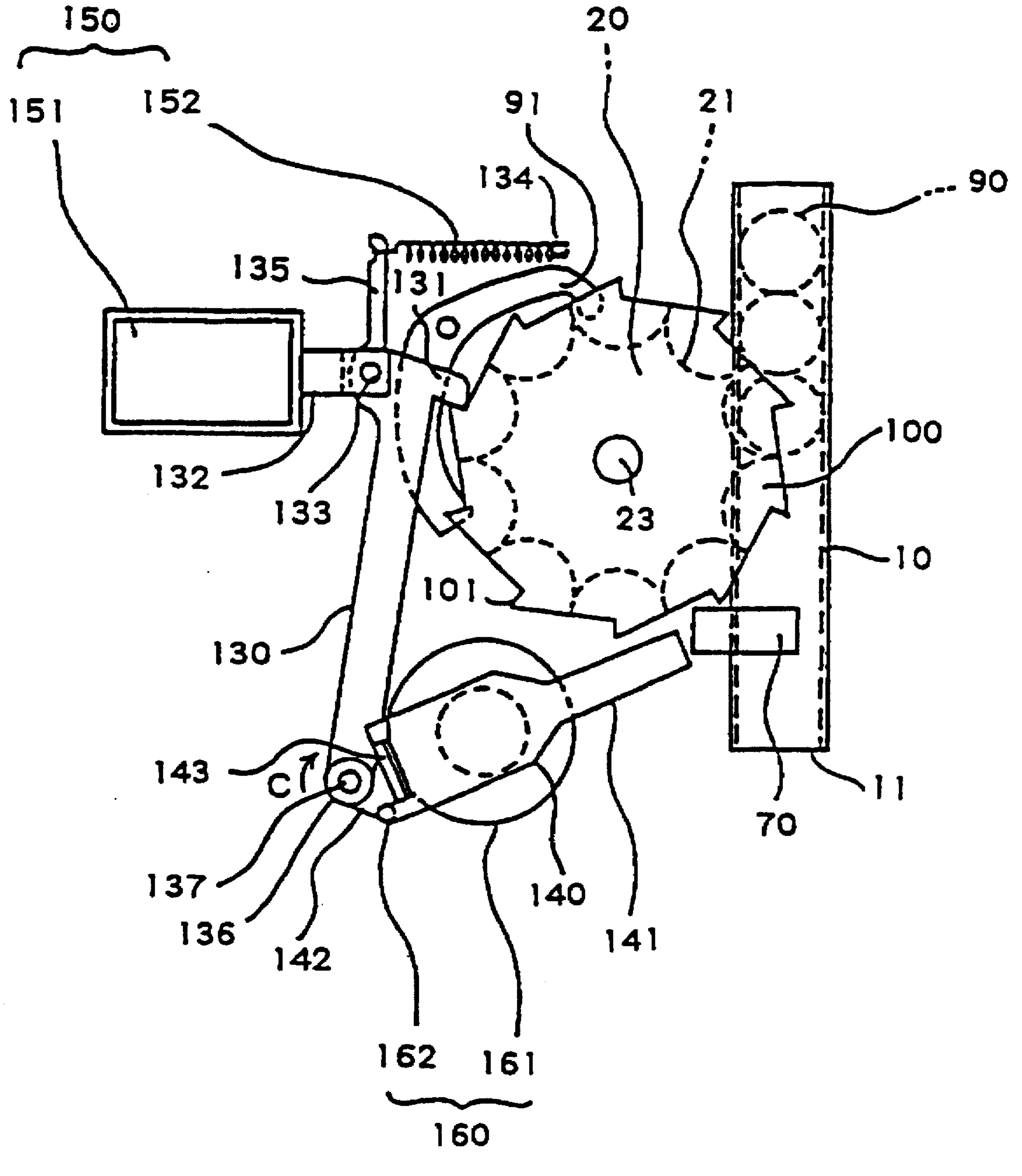
FIG. 5 is a front view of a game play media dispenser of a second embodiment of the invention.
Figure 6:
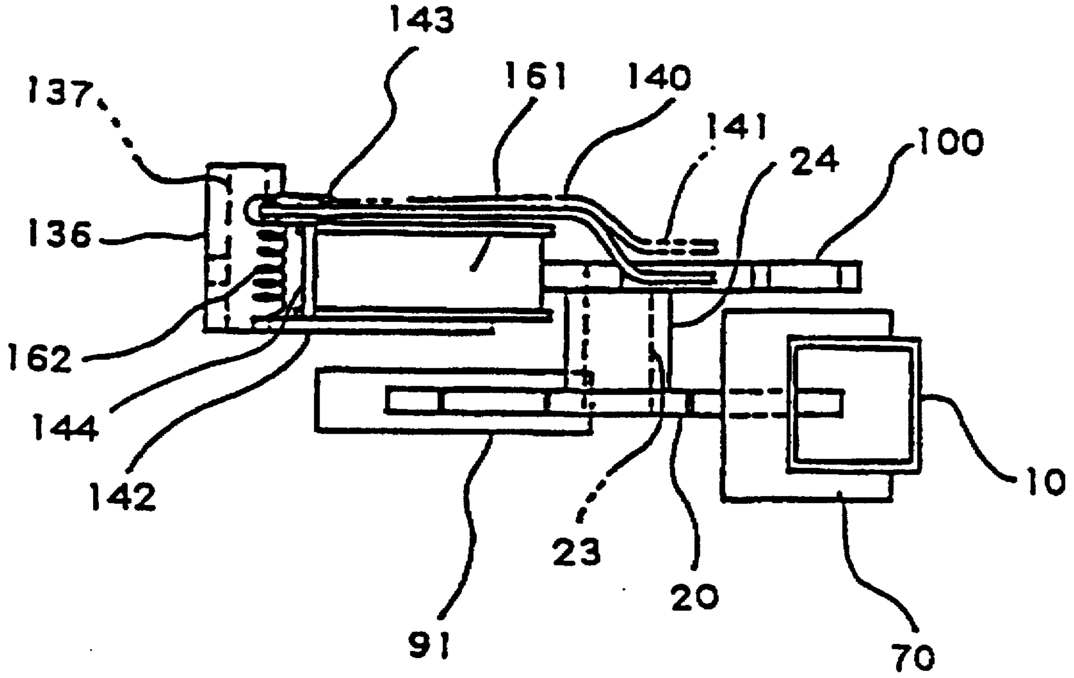
FIG. 6 is a bottom view of the game play media dispenser of the second embodiment of the invention.

As shown in FIGS. 5 and 6, a pachinko ball dispenser of the second embodiment comprises a ball passage 10, a gear 20, a ratchet wheel 100, a first stopper 130 and a second stopper 140 engaging the ratchet 100, first drive means 150 for driving the first stopper 130, second drive means 160 for driving the second stopper 140, a proximity sensor 70 for detecting pachinko balls 90 discharged through a discharge port 11 of the ball passage 10, and control means 180 (see FIG. 8) for controlling the first drive means 150 and the second drive means 160.

The ball passage 10, the gear 20, and the proximity sensor 70 are similar to those of the first embodiment. The first drive means 150 comprises a solenoid 151 and a spring 152 as in the first embodiment. This also applies to the second drive means 160. A governor 91 for suppressing excessively: fast rotation of the gear 20 is disposed on one side of the gear 20.

The outer peripheral surface of the ratchet wheel 100 is formed with a plurality of teeth 101 in one-to-one correspondence with a plurality of recesses 21 of the gear 20. The ratchet wheel 100 is fixed to a support shaft 23 together with the gear 20. The support shaft 23 is rotatably supported by a bearing 24 fixed to a cabinet (not shown). Therefore, the ratchet wheel 100 is rotated together with the gear 20 owing to the weight of pachinko balls 90.

A bearing 136 is located on one end of the first stopper 130. A support shaft 137 located in parallel with the support shaft 23 is inserted into the bearing 136. The first stopper 130 is swung with the support shaft 137 as the center by forces of the spring 152 and the first solenoid 151.

A base board 142 is fixed on the outer peripheral surface of the bearing 136. A second solenoid 161 and a support member 144 are located on the inner surface of the base board 142. The support member 144 supports the support shaft 143 so that the support shaft 143 becomes horizontal to the base board 142. The second stopper 140 is attached rotatably to the support shaft 143. It swings with the support shaft 137 as the center in the same direction together with the first stopper 130.

A tip 141 of the second stopper 140 bends toward the ratchet wheel 100 and further bends so as to become parallel with the ratchet wheel 100 at the point. The rear end of the second stopper 140 is coupled to the base board 142 via a spring 162. This spring 162 energizes the rear end of the second stopper 140 toward the base board 142 side. The tip 141 of the second stopper 140 swings with the support shaft 143 as the center in response to an attracting force of the second solenoid 161. When the tip 141 does not receive the attracting force, it is placed in the position indicated by a dotted line in FIG. 6 by the energy of the spring 162, namely, a position apart from the plane where the ratchet wheel 100 exists (third saving position).

A second drive circuit 182 (not shown) applies an exciting voltage to the second solenoid 161 for exciting it. When the second solenoid 161 is excited, the second stopper 140 is considered to be a movable element and it attracted directly so as to rotate from the third saving position to the position indicated by a solid line in FIG. 6 against energy of the spring 162. At this time, the tip 141 of the second stopper 140 lies on the plane where the ratchet wheel 100 exists.

On the other hand, the opposite end of the first stopper 130 is formed with a projection 131 engaging with one of the teeth 101 of the ratchet wheel 100 and an arm 135 to which one end of the spring 152 is fitted. Further, a pin 133 disposed on a movable element 132 of the first solenoid 151 is inserted in the opposite end of the first stopper 130. The opposite end of the spring 152 is fixed to a projection 134 located in a cabinet (not shown). The spring 152 energizes the first stopper 130 clockwise (in the direction of arrow C) with the support shaft 137 as the center. In FIG. 5, the first stopper 130 is pushed against the ratchet wheel 100 by the energy of the spring 152 for engaging the projection 131 with one of the teeth 101 of the ratchet wheel 100. The first stopper 130 is placed in such a state, whereby rotation of the ratchet wheel 100 can be prevented. At this time, the second stopper 140 lies in a position where it does not engage with the tooth 101 of the ratchet wheel 100 (second saving position), as shown in FIG. 5.

Figure 7:
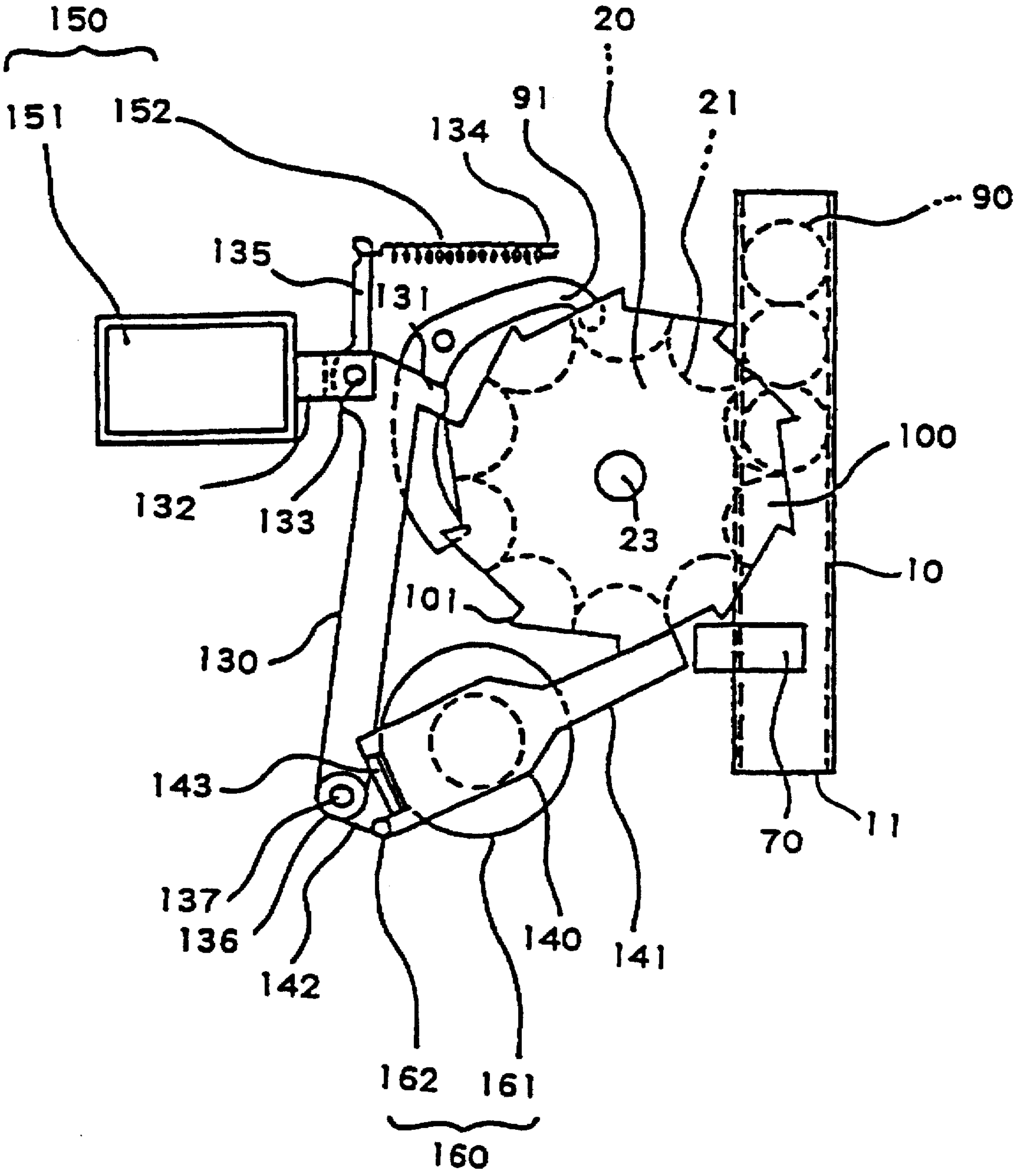
FIG. 7 is a front view of the game play media dispenser of the second embodiment of the invention.

A first drive circuit 181 (not shown) applies an exciting voltage to the first solenoid 151 for exciting it. When the first solenoid 151 is excited, it attracts the movable element 132 against the energy of the spring 152 and rotates the first stopper 130 from a position where the projection 131 engages with the tooth 101 of the ratchet wheel 100 (first engagement position) to a position where the projection 131 does not engage with any teeth 101 of the ratchet wheel 100 (first saving position). On the other hand, the second stopper 140 is associated with the first stopper 130 and rotates to a position as shown in FIG. 7 (second engagement position) just before the projection 131 of the first stopper 130 is detached from the tooth 101 of the ratchet wheel 100. At this time, it is assumed that the tip 141 of the second stopper 140 is not attracted by the second solenoid 161.

That is, when engagement of the ratchet wheel 100 with the projection 131 of the first stopper 130 is released, the ratchet wheel 100 starts rotating together with the gear 20 owing to the weight of pachinko balls 90, and rotates corresponding to about a half of the recess 21, so that the tooth 101 of the ratchet wheel 100 abuts the tip 141 of the second stopper 140 and stops.

The second engagement position of the second stopper 140 may be such a position where the ratchet wheel 100 can be stopped before the ratchet wheel 100 rotates one recess 21 or more after the projection 131 is detached from the ratchet wheel 100.

Next, the control means 180 will be discussed.

Figure 8:
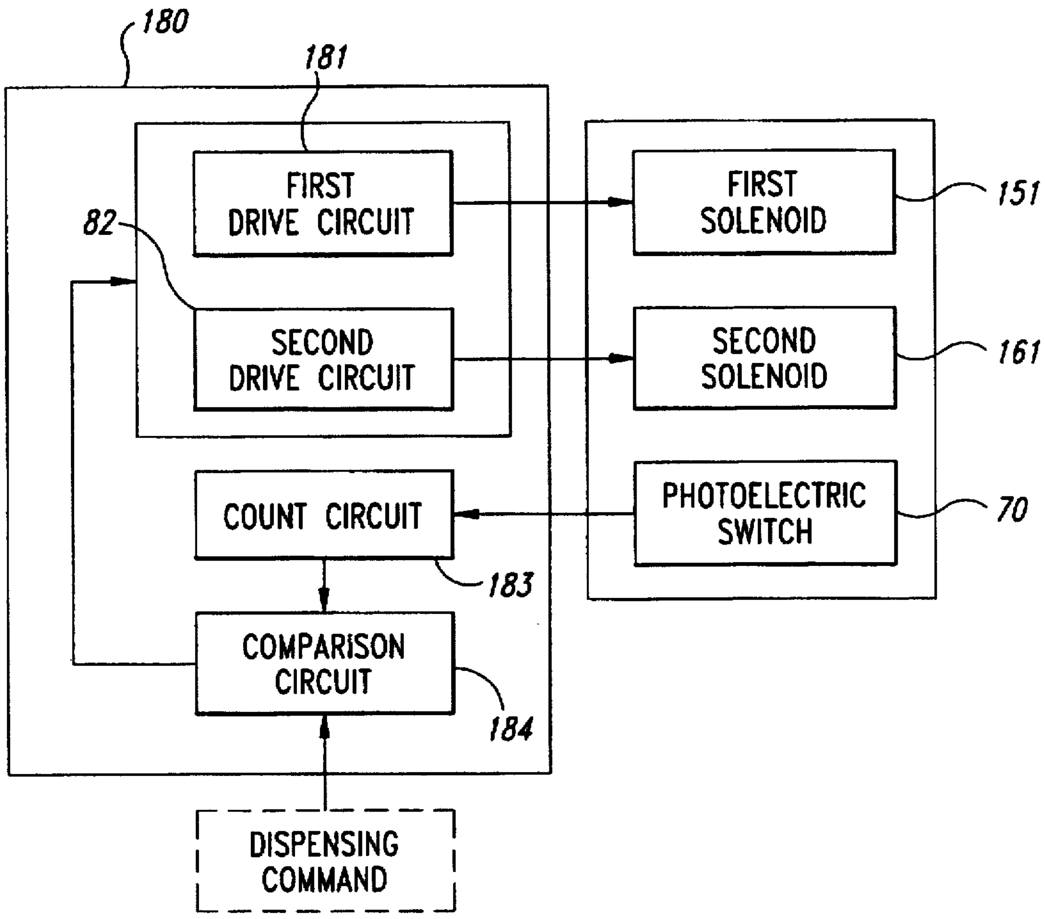
FIG. 8 is a block diagram concerning the game play media dispenser of the second embodiment of the invention.

As shown in FIG. 8, similarly to the control means 80 of the first embodiment, the control means 130 comprises a first drive circuit 181 for applying an exciting voltage to the first solenoid 151, a second drive circuit 182 for applying an exciting voltage to the second solenoid 161, a count circuit 183 for receiving a detection signal from a photoelectric switch 70 and finding the actual number of discharged pachinko balls 90, and a comparison circuit 184 for receiving the count result of the count circuit 183 and a dispensing command from a command circuit (not shown) and supplying an instruction to the first and second drive circuits 181 and 182.

Next, the operation of the embodiment will be discussed.

When a dispensing command is not input to the comparison circuit 184 and the first and second drive circuits 181 and 182 do not apply an exciting voltage, as shown in FIG. 5, the first stopper 130 is in the first engagement position due to a restoring force of the spring 152 and the second stopper 140 is in the third saving position due to a restoring force of the spring 162. In FIG. 5, since the projection 131 of the first stopper 130 engages one of the teeth 101 of the ratchet wheel 100, the ratchet wheel 100 is at a stop.

Figure 9:
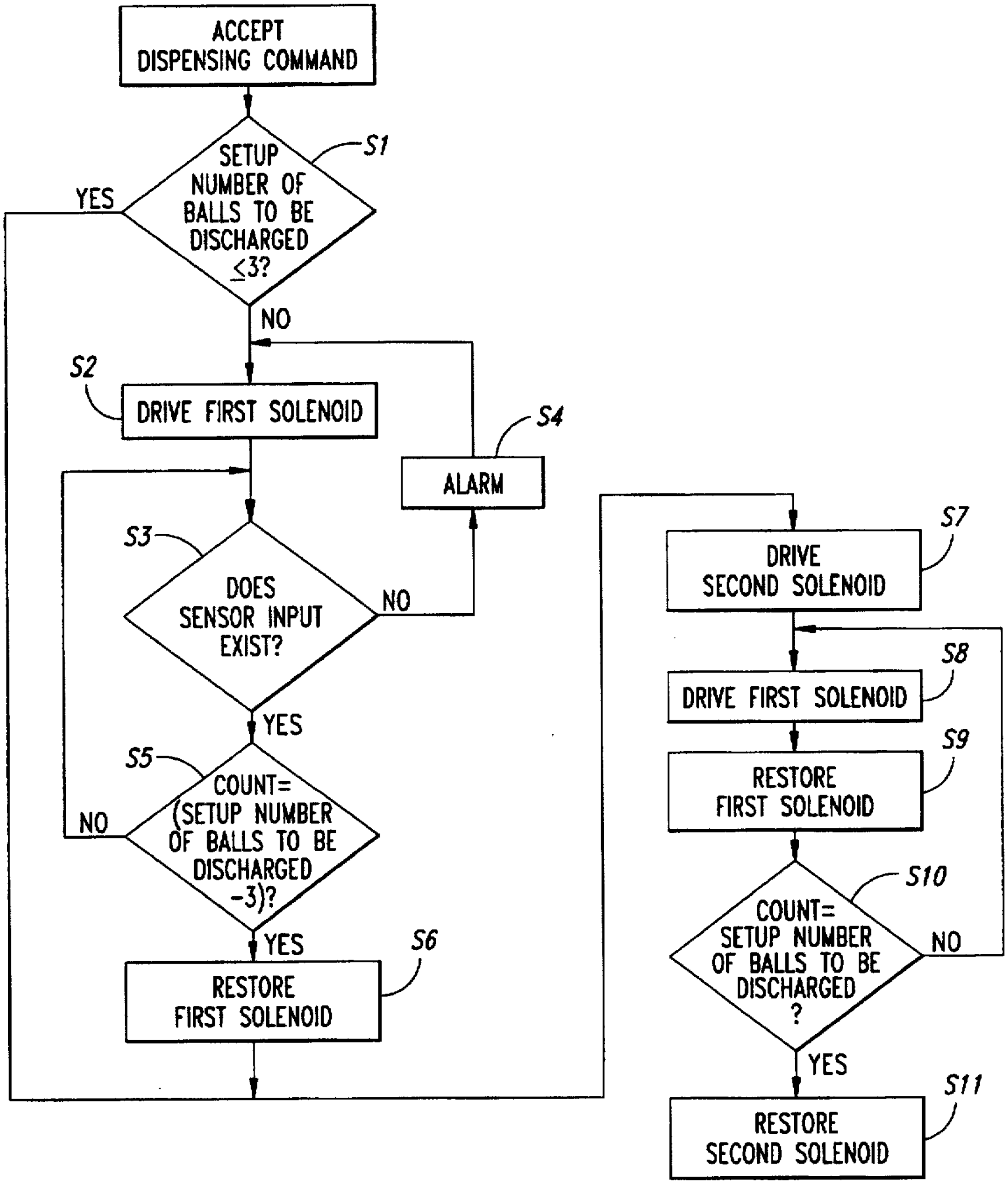
FIG. 9 is a flowchart concerning the operation of the game play media dispenser of the second embodiment of the invention.

Now, when a dispensing command is supplied to the comparison circuit 184, the circuits of the control means 180 including the comparison circuit 184 operate as in the flowchart shown in FIG. 9. Steps S1, S3, S4, and S5 in FIG. 9 are similar to those in the first embodiment and therefore will not be discussed again.

At step S2, the comparison circuit 184 instructs the first drive circuit 181 to apply an exciting voltage to the first solenoid 151. In response to the given instruction, the first drive circuit 181 applies an exciting voltage to the first solenoid 151, whereby the first stopper 130 moves from the first engagement position to the first saving position. On the other hand, the second stopper 140 approaches the ratchet wheel 100 in association with the first stopper 130, but does not engage with the ratchet wheel 100 because the tip 141 is in the third saving position. Therefore, when engagement of the first stopper 130 with the ratchet wheel 100 is released, the ratchet wheel 100 is enabled to rotate and the pachinko balls 90 in the ball passage 10 are discharged one after another through the discharge port 11 while rotating the gear 20.

If the actual number of discharged balls reaches the number smaller than the setup number of discharged balls by a predetermined number, the comparison circuit 184 executes step S6 for stopping rotation of the gear 20. At step S6, the comparison circuit 184 causes the first drive circuit 181 to stop driving the first solenoid 151, whereby the first stopper 130 moves to the first engagement position and enters the state as shown in FIG. 5.

At step S7, the comparison circuit 184 instructs the second drive circuit 182 to apply an exciting voltage to the second solenoid 161. In response to the given instruction, the second drive circuit 182 applies an exciting voltage to the second solenoid 161, whereby the second stopper 140 moves from the third saving position to the second saving position.

At step S8, the comparison circuit 184 drives the first solenoid 151 for detaching the projection 131 of the first stopper 130 from the ratchet wheel 100. The ratchet wheel 100 rotates owing to the weight of the pachinko ball 90 together with the gear 20, then abuts the tip 141 of the second stopper 140 and stops. The rotation amount of the ratchet wheel 100 at this time corresponds to about a half of the recess 21. Next, the comparison circuit 184 moves the first stopper 130 to the first engagement position at step S9. As the first stopper 130 is moved, the tip 141 of the second stopper 140 is detached from the tooth 101 of the ratchet wheel 100. The ratchet wheel 100 rotates corresponding to about a half of the recess 21, then abuts the projection 130 of the first stopper 130 and stops.

That is, at steps S8 and S9, the ratchet wheel 100 rotates one recess 21, whereby one of the pachinko balls 90 is discharged through the discharge port 11. The comparison circuit 184 stops driving the second solenoid 161 for moving the second stopper 140 to the third saving position at step S11.

Thus, upon acceptance of a dispensing command, as in the first embodiment, the pachinko ball dispenser of the second embodiment discharges pachinko balls at high speed, and after the actual number of discharged balls reaches the number smaller than the setup number of balls to be discharged by the predetermined number, can discharge pachinko balls accurately one at a time until the actual number of discharged balls reaches the setup number of balls to be discharged.

In the second embodiment, the second solenoid 161 moves the second stopper 140 when the second stopper 140 does not engage with the ratchet wheel 100. This means that the second solenoid 161 can move the second stopper 140 without receiving resistance from the ratchet wheel 100. Therefore, a small-sized solenoid having a small attraction force can be used for the second solenoid 161.

We have discussed the embodiments for applying the invention to pachinko ball dispensers using pachinko balls as game play media, but the invention can also be applied to dispensers using coins as game play media.

We claim:

1. A game play media dispenser which comprises a passage for allowing game play media to flow and a gear being formed with a plurality of recesses engaging with game play media on an outer peripheral surface, and while causing said plurality of recesses to engage with game play media flowing through said passage in sequence, rotating owing to the weight of the game play media for discharging the game play media into a discharge port of said passage, wherein as many game play media as a given number are discharged through said discharge port by controlling the rotation of said gear, characterized in that said gear further includes a plurality of teeth in one-to-one correspondence with said plurality of recesses, that said game play media dispenser further includes:

detection means for detecting game play media discharged through said discharge port;

a first stopper that can move to a first engagement position where it can engage with at least one of said plurality of teeth and a first saving position where it does not engage with any of said plurality of teeth;

a second stopper that can move to a second engagement position where it can engage with at least one of said plurality of teeth and a second saving position where it does not engage with any of said plurality of teeth;

drive means for moving said first stopper to the first engagement position and the first saving position, and moving said second stopper to the second engagement position and the second saving position; and control means for controlling the moving operation of said first stopper and the moving operation of said second stopper performed by said drive means, that said second engagement position is a position where said second stopper at said second engagement position engages with any of said plurality of teeth before said gear rotates one recess or more after the engagement of said first stopper with said gear is released, and that said control means accepts information indicating the given number and sets the number of media to be discharged smaller than the given number by a predetermined number, finds the actual number of discharged game play media from the detection result of said detection means, and after determining that at least the actual number of discharged media has reached the number smaller than the given number by the predetermined number, causes said drive means to move said first stopper to said first engagement position and said second stopper to said second saving position, and to move said first stopper to said first saving position and said second stopper to said second engagement position alternately, until said control means determines that the actual number of discharged media reaches said given number.

2. The game play media dispenser as claimed in claim 1 wherein said drive means comprises first drive means for moving said first stopper to said first engagement position and said first saving position and second drive means for moving said second stopper to said second engagement position and said second saving position, and wherein said control means upon acceptance of the information indicating the given number, causes said first drive means to move said first stopper to said first saving position and said second drive means to move said second stopper to said second saving position.

3. The game play media dispenser as claimed in claim 1 wherein said first and second stoppers are associated with each other so that when said first stopper is in said first engagement position, said second stopper is in said second saving position and that when said first stopper is in said first saving position, said second stopper is in said second engagement position, wherein said second stopper can further move to a third saving position, different from said second saving position, where it does not engage with any of said plurality of teeth when said first stopper is in said first engagement position, and wherein said control means upon acceptance of the information indicating the given number, causes said drive means to move said first stopper to said first saving position with said second stopper held in said third saving position.

* * * * *